(12) United States Patent  
Gao et al.

(10) Patent No.: US 10,308,771 B2
(45) Date of Patent: Jun. 4, 2019

(54) COATING COMPOSITIONS AND COATINGS FOR ADJUSTING FRICTION

(71) Applicant: PPG Industries Ohio, Inc., Cleveland, OH (US)

(72) Inventors: Renlong Gao, Westlake, OH (US); Shanti Swarup, Allison Park, PA (US); Xiangling Xu, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 195 days.

(21) Appl. No.: 15/252,736

(22) Filed: Aug. 31, 2016

(65) Prior Publication Data

US 2018/0057640 A1  Mar. 1, 2018

(51) Int. Cl.
| | |
|---|---|
| *C08G 77/18* | (2006.01) |
| *C08G 77/388* | (2006.01) |
| *C03C 17/30* | (2006.01) |
| *C09D 183/08* | (2006.01) |
| *C08K 5/54* | (2006.01) |
| *C08K 5/5415* | (2006.01) |
| *C08K 5/5425* | (2006.01) |
| *C08K 5/544* | (2006.01) |

(52) U.S. Cl.
CPC ............ *C08G 77/388* (2013.01); *C03C 17/30* (2013.01); *C08K 5/5403* (2013.01); *C08K 5/544* (2013.01); *C08K 5/5415* (2013.01); *C08K 5/5425* (2013.01); *C09D 183/08* (2013.01)

(58) Field of Classification Search
CPC ...... C08G 77/06; C08G 77/18; C08G 77/388; C09D 183/08
See application file for complete search history.

(56) References Cited

U.S. PATENT DOCUMENTS

| | | | |
|---|---|---|---|
| 4,378,389 A | 3/1983 | Maruyama et al. | |
| 5,024,711 A | 6/1991 | Gasser et al. | |
| 5,154,759 A * | 10/1992 | Cifuentes | C08G 77/54 106/10 |
| 5,300,237 A * | 4/1994 | Ona | C03C 25/1095 252/8.63 |
| 5,384,340 A * | 1/1995 | Hara | C08G 77/388 522/170 |
| 5,645,752 A | 7/1997 | Weiss et al. | |
| 6,133,466 A | 10/2000 | Edelmann et al. | |
| 6,281,321 B1 | 8/2001 | Kelly et al. | |
| 6,303,229 B2 | 10/2001 | Takahama et al. | |
| 7,064,173 B2 | 6/2006 | Rubinsztajn et al. | |
| 7,241,851 B2 | 7/2007 | Cella et al. | |
| 7,354,628 B2 | 4/2008 | Steube | |
| 7,459,515 B2 | 12/2008 | Gommans et al. | |
| 7,837,824 B2 | 11/2010 | Issari et al. | |
| 8,153,566 B2 | 4/2012 | Yamaguchi et al. | |
| 8,563,648 B2 | 10/2013 | Schmeltzer et al. | |
| 2002/0098364 A1 | 7/2002 | Bernard et al. | |
| 2003/0105207 A1 | 6/2003 | Kleyer et al. | |
| 2004/0254291 A1 | 12/2004 | Kobayashi et al. | |
| 2006/0039889 A1 | 2/2006 | Lafaysse et al. | |
| 2006/0281889 A1 | 12/2006 | Kobayashi et al. | |
| 2007/0032587 A1 | 2/2007 | Nakashima et al. | |
| 2007/0122540 A1 | 5/2007 | Salamone et al. | |
| 2008/0262157 A1 | 10/2008 | Nakata et al. | |
| 2009/0088547 A1 | 4/2009 | Schamschurin et al. | |
| 2012/0208029 A1 | 8/2012 | Lin | |
| 2014/0255832 A1 | 9/2014 | Qiu | |

FOREIGN PATENT DOCUMENTS

| | | |
|---|---|---|
| AU | 2003256746 B1 | 2/2004 |
| EP | 0326097 A2 | 8/1989 |
| EP | 0640670 A2 | 3/1995 |
| EP | 1357154 A1 | 10/2003 |
| EP | 2607436 A1 | 6/2013 |
| JP | 09324171 A | 12/1997 |
| JP | 2015203807 A | 11/2015 |
| WO | 2012056716 A1 | 5/2012 |
| WO | 2014081044 A2 | 5/2014 |

* cited by examiner

*Primary Examiner* — Margaret G Moore
(74) *Attorney, Agent, or Firm* — Justin P. Martinchek

(57) ABSTRACT

An alkoxysilane functionalized polysiloxane polymer can be prepared from a mixture of reactants including: a) a polysiloxane polymer having two or more reactive functional groups selected from -A-$NH_2$, -A-OH, -A-N=C=O, -A-COOH,

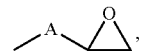

or combinations thereof; and b) at least one alkoxysilane having a functional group that is reactive with the reactive functional groups on the polysiloxane polymer. The alkoxysilane functionalized polysiloxane polymer can be combined with additional components to form a coating composition.

19 Claims, No Drawings

COATING COMPOSITIONS AND COATINGS FOR ADJUSTING FRICTION

FIELD OF THE INVENTION

The present invention relates to alkoxysilane functionalized polysiloxane polymers, coating compositions containing such polymers, and coatings formed therefrom as well as methods of preparing the coating compositions and coatings.

BACKGROUND OF THE INVENTION

Consumer electronic devices such as cellular phones, notebook monitors, television screens, and the like are often designed with a touch screen display. The touch screen display allows a person to input data and complete various activities by touching the display. One of the drawbacks associated with such devices is the friction between the surface of the touch screen and the user's fingertips or between a coating layer deposited over the surface of the touch screen and the user's fingertips. The coating layer deposited over the surface of the touch screen is typically applied as a chemical resistant and/or mechanical resistant coating layer.

Considerable efforts have been expended to reduce the friction associated with touch screens without compromising their functionality. For instance, different surface pre-treatments and coatings have been developed to help reduce friction associated with touch screens. While these approaches have reduced the friction associated with touch screens, it is desirable to provide improved coatings that more effectively reduce friction between the surface of the touch screen and the user's fingertips.

SUMMARY OF THE INVENTION

The present invention is directed to an alkoxysilane functionalized polysiloxane polymer prepared from a mixture of reactants comprising: a) a polysiloxane polymer represented by Chemical Structure (I):

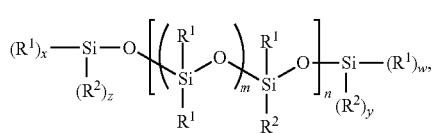

(I)

and b) at least one alkoxysilane comprising a functional group B that is reactive with the reactive functional groups of $R^2$ on the polysiloxane polymer of (a). With respect to Formula I, m is a value of 10 or greater, n is a value of 2 or greater and w, x, y, and z are each independently selected from a value of 0 to 3 provided that $x+z=3$ and $w+y=3$. Each $R^1$ is independently hydrogen or a $C_1$-$C_6$ alkyl. Each $R^2$ is independently hydrogen, a $C_1$-$C_6$ alkyl, -A-$NH_2$, -A-OH, -A-N=C=O, -A-COOH, or

where A is a $C_1$-$C_6$ alkylene or $R^3$—NH—$R^3$ and each $R^3$ is independently a $C_1$-$C_6$ alkylene. Further, each $R^2$, z, and y are chosen to provide two or more reactive functional groups on the polysiloxane polymer that are selected from -A-$NH_2$, -A-OH, -A-N=C=O, -A-COOH,

or combinations thereof.

The present invention is also directed to a coating composition. The coating composition can include the previously described alkoxysilane functionalized polysiloxane polymer.

The present invention is further directed to a method of preparing an alkoxysilane functionalized polysiloxane polymer comprising reacting the mixture of reactants previously described. The present invention also concerns a method of applying a coating to a substrate comprising (a) mixing the alkoxysilane functionalized polysiloxane polymer in a non-aqueous medium with a protonic acid and (b) applying the mixture of (a) at least partially over a substrate under conditions to form a coating over the substrate.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" alkoxysilane functionalized polysiloxane polymer, "an" alkoxysilane, "a" protonic acid, and the like refer to one or more of any of these items.

As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5 weight % water, based on the total weight of the liquid medium. The solvents that make up at least or more than 50 weight % and optionally up to 100 weight % of the liquid medium include organic solvents. Non-limiting examples of suitable organic solvents include polar organic solvents e.g. protic organic solvents such as glycols, glycol ether alcohols, alcohols; and aprotic organic solvents such as ketones, glycol diethers, esters, and diesters. Other non-limiting examples of organic solvents include non-polar solvents such as aromatic and aliphatic hydrocarbons.

The term "silane" refers to a compound derived from $SiH_4$ by substituting organic groups for one or more of the hydrogen atoms, and the term "alkoxy" refers to an —O-alkyl group. Further, an "alkoxysilane" refers to a silane compound with at least one alkoxy group bonded to a silicon atom.

As used herein, the term "polysiloxane" refers to a polymer with a backbone or main chain that contains one or more Si—O—Si linkages. An "organopolysiloxane" refers to a polysiloxane polymer comprising one or more organic groups. An "organic group" refers to a carbon containing group. The organic group can include linear, branched, or cyclic alkyl groups and/or alkylene groups.

The term "polymer" refers to oligomers and homopolymers (e.g., prepared from a single monomer species), copolymers (e.g., prepared from at least two monomer species), polymers prepared with more than two, such as three or more, monomer species, and graft polymers. The term "resin" is used interchangeably with "polymer."

In addition, as used herein, "ethylenically unsaturated" refers to a group having at least one carbon-carbon double bond. The term "(meth)acrylate" and like terms refers both to the acrylate and the corresponding methacrylate.

The term "alkyl" as used herein refers to a linear, branched, and/or cyclic monovalent, saturated hydrocarbon radical. The alkyl group may include, but is not limited to, a linear or branched $C_1$-$C_{30}$ monovalent hydrocarbon radical, or a linear or branched $C_1$-$C_{20}$ monovalent hydrocarbon radical, or a linear or branched $C_1$-$C_{10}$ monovalent hydrocarbon radical. The alkyl group may also include, but is not limited to, a cyclic $C_3$-$C_{19}$ monovalent hydrocarbon radical, or a cyclic $C_3$-$C_{12}$ monovalent hydrocarbon radical, or a cyclic $C_5$-$C_7$ monovalent hydrocarbon radical.

The term "alkylene" refers to a linear, branched, and/or cyclic divalent, saturated hydrocarbon radical. The alkylene group may include, but is not limited to, a linear or branched $C_1$-$C_{30}$ divalent hydrocarbon radical, or linear or branched $C_1$-$C_{20}$ divalent hydrocarbon radical, or linear or branched $C_1$-$C_{10}$ divalent hydrocarbon radical. The alkylene group may also include, but is not limited to, a cyclic $C_3$-$C_{19}$ divalent hydrocarbon radical, or a cyclic $C_3$-$C_{12}$ divalent hydrocarbon radical, or a cyclic $C_5$-$C_7$ divalent hydrocarbon radical.

The recitations of "linear, branched, or cyclic" groups, such as linear, branched, or cyclic alkyl or alkylene, are herein understood to include: a divalent methylene group or a monovalent methyl group; groups that are linear, such as linear $C_2$-$C_{30}$ alkyl or alkylene groups; groups that are appropriately branched, such as branched $C_3$-$C_{30}$ alkyl or alkylene groups; and groups that are cyclic, such as cyclic $C_3$-$C_{19}$ alkyl or alkylene groups. The cyclic groups also encompass bridged ring polycycloalkyl groups (or bridged ring polycyclic groups) and fused ring polycycloalkyl groups (or fused ring polycyclic groups).

As indicated, the present invention includes an alkoxysilane functionalized polysiloxane polymer that can be prepared from a mixture of reactants that include a polysiloxane polymer comprising two or more reactive functional groups per polymer chain, and at least one alkoxysilane comprising a functional group reactive with the functional groups of the polysiloxane polymer.

The polysiloxane polymer comprising two or more reactive functional groups per polymer chain can comprise an organopolysiloxane. The reactive functional groups can be attached directly or indirectly to a silicon atom as a pendent and/or terminal group. A "pendant group," also referred to as a "side chain", is an offshoot from the polymer main chain and is not part of the main chain, and a "terminal group" refers to a functional group positioned at the end of the polymer main chain. For example, the polysiloxane polymer can include a polydimethylsiloxane polymer comprising two or more reactive functional pendant groups.

As indicated, the two or more reactive functional groups of the polysiloxane polymer can be attached directly to a silicon atom. Alternatively, the reactive functional groups can be attached indirectly to a silicon atom. For instance, reactive functional groups can be attached to an organic group that is attached to a silicon atom. The organic group can include an alkylene such as a $C_1$-$C_6$ or a $C_1$-$C_3$ alkylene for example. The reactive functional groups can also be attached through a chain represented by R—NH—R in which each R is independently an alkylene such as a $C_1$-$C_6$ or a $C_1$-$C_3$ alkylene. It is appreciated that the amino group of the R—NH—R can also act as a reactive functional group.

Each of the reactive functional groups of the polysiloxane polymer can independently comprise an amino group, a hydroxyl group, an acid group, an epoxy group, an isocyanate group, or combinations thereof. Further, the amino group can include a primary amino group or a secondary amino group. A "primary amino group" refers to a functional group represented by the structural formula —$NH_2$, and a "secondary amino group" refers to a functional group represented by the structural formula —NRH in which R is an alkyl group such as a $C_1$-$C_6$ or a $C_1$-$C_3$ alkyl group.

Suitable polysiloxane polymers are represented by Chemical Structure I:

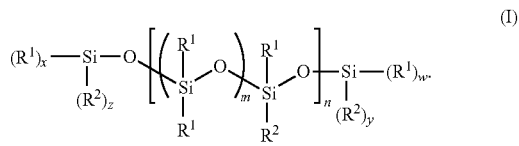

(I)

With respect to Chemical Formula I, m is a value of 10 or greater, such as 15 or greater, or 20 or greater. Further, n is a value of 2 or greater, and w, x, y, and z are each independently selected from a value of 0 to 3 provided that x+z=3 and w+y=3. Each $R^1$ is independently hydrogen or a $C_1$-$C_6$ alkyl such as a $C_1$-$C_3$ alkyl. Each $R^2$ is independently hydrogen, a $C_1$-$C_6$ alkyl such as a $C_1$-$C_3$ alkyl, -A-$NH_2$, -A-OH, -A-N=C=O, -A-COOH, or

where A is a $C_1$-$C_6$ alkylene such as a $C_1$-$C_3$ alkylene or $R^3$—NH—$R^3$ in which each $R^3$ is independently a $C_1$-$C_6$ alkylene such as a $C_1$-$C_3$ alkylene.

As previously described, the polysiloxane polymer comprises at least two reactive functional groups. As such, each $R^2$ and z and y are chosen from the substituents and values described above to provide two or more reactive functional groups on the polysiloxane polymer that are selected from -A-NH$_2$, -A-OH, -A-N=C=O, -A-COOH,

or combinations thereof. Thus, $R^2$, z, and y are chosen from the substituents described above to provide a polysiloxane polymer with two or more reactive functional groups comprising an amino group, a hydroxyl group, an acid group, an epoxy group, an isocyanate group, or combinations thereof.

The polysiloxane polymer, such as the polysiloxane polymer represented by Chemical Formula I, can comprise at least 50 weight %, at least 70 weight %, at least 80 weight %, or at least 85 weight %, based on the total solids weight of the reactants used to prepare the alkoxysilane functionalized polysiloxane polymer. The polysiloxane polymer can comprise up to 95 weight %, up to 98 weight %, or up to 99 weight %, based on the total solids weight of the reactants used to prepare the alkoxysilane functionalized polysiloxane polymer. The polysiloxane polymer can also comprise a weight % within a range from 50 to 99 weight %, from 70 to 99 weight %, from 80 to 98 weight %, or from 85 to 95 weight %, based on the total solids weight of the reactants used to prepare the alkoxysilane functionalized polysiloxane polymer.

As previously described, the mixture of reactants used to prepare the alkoxysilane functionalized polysiloxane polymer also comprises at least one alkoxysilane comprising a functional group reactive with the functional groups of the polysiloxane polymer. For instance, the mixture of reactants used to prepare the alkoxysilane functionalized polysiloxane polymer can comprise two or more, or three or more, alkoxysilanes. The alkoxysilane can also comprise multiple alkoxy groups bonded to the silicon atom. For example, the alkoxysilane can comprise two alkoxy groups, or three alkoxy groups, bonded to the silicon atom. As such, the alkoxysilane can have one, two, or three alkoxy groups, and a functional group reactive with the functional groups of the polysiloxane polymer. The alkoxy groups that can be bonded to the silicon atom include, but are not limited to, alkoxy groups with a $C_1$ to $C_{20}$ carbon chain, a $C_1$ to $C_{10}$ carbon chain, a $C_1$ to $C_6$ carbon chain, or a $C_1$ to $C_4$ carbon chain. Non-limiting examples of suitable alkoxy groups include methoxy, ethoxy, propoxy, isopropoxy, butoxy, sec-butoxy, isobutoxy, t-butoxy, pentoxy, isopentoxy, and combinations thereof.

Further, the reactive functional group of the alkoxysilane can be any functional group that is reactive with the functional groups of the polysiloxane polymer. For example, when the polysiloxane polymer is represented by Chemical Formula I, the alkoxysilane includes a functional group B that is reactive with the reactive functional groups of $R^2$. Non-limiting examples of reactive functional groups B on the alkoxysilane include ethylenically unsaturated groups, epoxy groups, amino groups, hydroxyl groups, isocyanate groups, and combinations thereof. Suitable ethylenically unsaturated groups include, but are not limited to, vinyl groups, (meth)acrylate groups, and combinations thereof.

It is appreciated that the reaction between the reactive functional groups of the polysiloxane polymer and the alkoxysilane will form a linkage connecting the alkoxysilane and the polysiloxane polymer. The linkage formed from this reaction can comprise, for example, nitrogen atoms, oxygen atoms, carbonyl groups, or combinations thereof. For instance, the reactive functional groups of the polysiloxane polymer and the alkoxysilane can be reacted to form a linkage comprising nitrogen atoms such as from the formation of a urethane linkage or a urea linkage. The reactive functional groups of the polysiloxane polymer and the alkoxysilane can also provide various types of atoms in the final polymer after being reacted, such as nitrogen atoms from the amino groups used in a Michael Addition reaction.

Non-limiting examples of alkoxysilanes comprising a reactive functional group include those represented by Chemical Formula II:

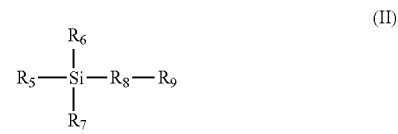

With respect to Chemical Formula II, $R_5$, $R_6$, and $R_7$ are each an alkoxy group such as, for example, $C_1$-$C_6$ alkoxy groups or $C_1$-$C_3$ alkoxy groups. $R_8$ is a $C_1$-$C_{20}$ alkylene, such as a $C_1$ to $C_{10}$ alkylene, a $C_1$ to $C_6$ alkylene, or a $C_1$ to $C_4$ alkylene. $R_9$ is an ethylenically unsaturated group, an epoxy group, an amino group, a hydroxyl group, or an isocyanate group that is reactive with the two or more reactive functional groups on the polysiloxane polymer.

In some examples, when the polysiloxane polymer is represented by Chemical Formula I and comprises reactive amino functional groups, the alkoxysilane can be represented by Chemical Formula II with $R_9$ being an ethylenically unsaturated group, such as a (meth)acrylate group, to react with the amino functional groups of the polysiloxane polymer through a Michael addition reaction. Non-limiting examples of such alkoxysilanes include γ-(meth)acryloxypropyltrimethoxysilane, γ-(meth)acryloxypropyltriethoxysilane, γ-(meth)acryloxypropyltributoxysilane, γ-(meth)acryloxypropyltripropoxysilane, and combinations thereof.

The alkoxysilane can comprise at least 1 weight % or at least 2 weight %, based on the total solids weight of the reactants used to prepare the alkoxysilane functionalized polysiloxane polymer. The alkoxysilane can comprise up to 20 weight %, up to 30 weight %, up to 40 weight %, or up to 50 weight %, based on the total solids weight of the reactants used to prepare the alkoxysilane functionalized polysiloxane polymer. The alkoxysilane can also comprise a weight % within a range such as from 1 to 50 weight %, from 1 to 30 weight %, or from 2 to 20 weight %, based on the total solids weight of the reactants used to prepare the alkoxysilane functionalized polysiloxane polymer.

The polysiloxane polymer comprising two or more reactive functional groups per polymer chain and the at least one alkoxysilane comprising a functional group reactive with the functional groups of the polysiloxane polymer can be combined at a particular ratio to form the alkoxysilane functionalized polysiloxane polymer. For example, the polysiloxane polymer can be combined with the alkoxysilanes such that a molar ratio of the total amount of reactive functional groups of the polysiloxane polymer to a total amount of functional groups reactive with the polysiloxane polymer on all the alkoxysilanes is from 1:1 to 1:0.01, or from 1:1 to 1:0.05, or from 1:1 to 1:0.1, or from 1:1 to 1:0.5.

As used herein, the recitation of "total amount of reactive groups of the polysiloxane polymer" means the total sum of reactive functional group equivalents on the polysiloxane polymer, and the recitation of "total amount of functional groups reactive with the polysiloxane polymer on all the alkoxysilanes" means the total sum of reactive functional group equivalents of all the alkoxysilanes that are reactive with the reactive groups of the polysiloxane polymer.

The alkoxysilane functionalized polysiloxane polymer can comprise a particular polymer architecture. For example, the previously described components can be reacted to form a linear polysiloxane polymer comprising pendant and/or terminal alkoxysilane groups. In some examples, the previously described components can be selected and reacted to form a linear polydimethylsiloxane polymer comprising pendant alkoxysilane groups.

The alkoxysilane functionalized polysiloxane polymer prepared from the mixture of reactants can comprise a weight average molecular weight of greater than 2,500 g/mol, or greater than 5,000 g/mol, or greater than 10,000 g/mol, or greater than 15,000 g/mol. The weight average molecular weight is determined by gel permeation chromatography versus a polystyrene standard with tetrahydrofuran as the mobile phase.

The alkoxysilane functionalized polysiloxane polymer can also have a glass transition temperature (Tg) of 25° C. or less, 0° C. or less, −25° C. or less, or −50° C. or less, or -75 ° C. or less. The glass transition temperature (Tg) is determined by differential scanning calorimetry with a rate of heating of 20° C./min and in which the Tg is taken at the first inflection point.

The alkoxysilane functionalized polysiloxane polymer of the present invention can be prepared by mixing the polysiloxane polymer and the at least one alkoxysilane such as at the ratios previously described. Optionally, the components are mixed in a non-aqueous medium such as any of the solvents previously described. The non-aqueous liquid medium can help prevent the alkoxy groups on the silane from hydrolyzing and forming a silanol. This in turn prevents silanol condensation and reactions between the silanol groups and other functional groups such as hydroxyl groups.

The mixture of reactants can be mixed under heat such that the polysiloxane polymer and alkoxysilanes react to form the alkoxysilane functionalized polysiloxane polymer. For example, the mixture of reactants can be reacted together at a temperature of 40° C. to 100° C. to form the alkoxysilane functionalized polysiloxane polymer.

The present invention is also directed to a coating composition that includes at least one of the alkoxysilane functionalized polysiloxane polymers previously described. The alkoxysilane functionalized polysiloxane polymers used with the coating composition can comprise at least 0.01 weight %, at least 0.05 weight %, at least 0.1 weight %, or at least 1 weight %, based on the total weight of the coating composition. The alkoxysilane functionalized polysiloxane polymers can comprise up to 10 weight %, up to 8 weight %, or up to 5 weight %, based on the total weight of the coating composition. The alkoxysilane functionalized polysiloxane polymers can also comprise a weight % within a range from 0.01 to 10 weight %, from 0.05 to 10 weight %, from 1 to 10 weight %, or from 1 to 8 weight %, based on the total weight of the coating composition.

It is appreciated that the coating composition of the present invention can include two or more, such as three or more, alkoxysilane functionalized polysiloxane polymers. When the coating composition includes multiple alkoxysilane functionalized polysiloxane polymers, the alkoxysilane functionalized polysiloxane polymers can have the same or different average weight molecular weights.

The coating composition can also include a protonic acid. As used herein, a "protonic acid" refers to an acid that forms positive hydrogen ions in aqueous solution. The protonic acid can include, but is not limited to, carboxylic acids, hydrogen halides, sulfuric acid, nitric acid, or combinations thereof. Non-limiting examples of suitable carboxylic acids include formic acid, acetic acid, propionic acid, butyric acid, capric acid, benzoic acid, and combinations thereof. Further, non-limiting examples of hydrogen halides include, but are not limited to, hydrogen fluoride, hydrogen chloride, hydrogen bromide, and combinations thereof.

The protonic acid used with the coating composition of the present invention can be diluted in an aqueous solution to form a desired acid concentration. For example, the protonic acid can be mixed in water to form a 10% (v/v), or a 5% (v/v), or a 1% (v/v), or a 0.5% (v/v), protonic acid aqueous solution. The coating composition can comprise from 0.01 to 5 parts by weight of a protonic acid per 100 parts by weight of the alkoxysilane functionalized polysiloxane polymer.

The coating composition can further include a non-aqueous liquid medium such as any of the organic solvents previously described. The coating composition can include at least 50 weight %, or at least 70 weight %, or at least 80 weight %, or at least 90 weight %, or at least 95 weight % of a non-aqueous liquid medium, based on the total weight of the coating composition.

The coating compositions of the present invention can also include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based dyes such as phthalo green or blue, iron oxide, bismuth vanadate, anthraquinone, and peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, fillers including, but not limited to, micas, talc, clays, and inorganic minerals, anti-oxidants, surfactants, flow and surface control agents, thixotropic agents, reactive diluents, catalysts, reaction inhibitors, and other customary auxiliaries.

It is appreciated that the coating composition of the present invention can be free of additional resins and/or crosslinkers other than those previously described. Alternatively, the coating composition of the present invention can include additional resins and/or crosslinkers. The additional resins can include any of a variety of thermoplastic and/or thermosetting resins known in the art. As used herein, the term "thermosetting" refers to resins that "set" irreversibly upon curing or crosslinking, wherein the polymer chains are joined together by covalent bonds. This property is usually associated with a cross-linking reaction often induced, for example, by heat or radiation. Curing or crosslinking reactions also may be carried out under ambient conditions. Once cured, a thermosetting resin will not melt upon the application of heat and is insoluble in solvents. As noted, the additional resins can also include a thermoplastic resin. As used herein, the term "thermoplastic" refers to resins that include polymeric components that are not joined by covalent bonds and, thereby, can undergo liquid flow upon heating and are soluble in solvents.

The additional resins can be selected from, for example, polyurethanes, acrylic polymers, polyester polymers, polyamide polymers, polyether polymers, polysiloxane polymers that are different than those previously described, epoxy resins, vinyl resins, copolymers thereof, and mixtures thereof. Thermosetting resins typically comprise reactive functional groups. The reactive functional groups can include, but are not limited to, carboxylic acid groups, amine groups, epoxide groups, hydroxyl groups, thiol groups, carbamate groups, amide groups, urea groups, isocyanate groups (including blocked isocyanate groups), and combinations thereof.

Coating compositions containing thermosetting resins typically comprise a crosslinker known in the art to react with the functionality on the thermosetting resins. As used herein, the term "crosslinker" refers to a molecule comprising two or more functional groups that are reactive with other functional groups and which is capable of linking two or more monomers or polymer molecules through chemical bonds. The thermosetting resins can also have functional groups that are reactive with themselves; in this manner, such resins are self-crosslinking.

The coating compositions of the present invention can be prepared by forming an alkoxysilane functionalized polysiloxane polymer from the mixture reactants previously described, and then mixing the alkoxysilane functionalized polysiloxane polymer with a protonic acid and, optionally, any of the other previously described components, in a non-aqueous medium. The coating compositions can then be applied at least partially over a substrate. The coating compositions of the present invention can be applied to a wide range of substrates known in the coatings industry.

Non-limiting examples of suitable substrates include automotive substrates, industrial substrates, packaging substrates, wood flooring and furniture, apparel, electronics, including housings and circuit boards, glass and transparencies, sports equipment, including golf balls, and the like. These substrates can be, for example, metallic or non-metallic. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, blends of polycarbonate and acrylonitrile butadiene styrene copolymer (PC/ABS), polyamide, wood, veneer, wood composite, particle board, medium density fiberboard, cement, stone, sapphire, glass, paper, cardboard, textiles, leather, both synthetic and natural, and the like. Non-limiting examples of glass substrates include conventional untinted soda-lime-silica glass, i.e., "clear glass", or tinted or otherwise colored glass, borosilicate glass, GORILLA® glass (commercially available from Corning, Inc.), leaded glass, tempered, untempered, annealed, or heat-strengthened glass. The glass may be of any type, such as conventional float glass or flat glass, and may be of any composition having any optical properties, e.g., any value of visible radiation transmission, ultraviolet radiation transmission, infrared radiation transmission, and/or total solar energy transmission. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel.

The coating compositions of the present invention are particularly useful when applied to glass substrates, plastic substrates, and combinations thereof that are found on consumer electronic products. For example, the coating compositions of the present invention can be applied to glass and/or plastic substrates found on laptops, tablets, cellular phones, other handheld electronic devices, TVs, and the like. The glass and/or plastic of such devices can comprise a touch screen or display.

The coating compositions of the present invention can be applied by various means known in the art including, but not limited to, spraying, spin coating, dip coating, or a combination thereof. After the coating compositions are applied to a substrate, the compositions can be dried or cured at ambient conditions, with heat, or with other means such as actinic radiation to form a coating. In some examples, the coating compositions of the present invention are heated at temperature within a range of 150° C. to 250° C., or from 175° C. to 225° C., or from 150° C. to 200° C., to form a coating over the surface of the substrate. The coating compositions of the present invention can be heated at such temperatures for a time period selected within a range of 5 minutes to 80 minutes, or from 5 minutes to 60 minutes, to form a coating over the surface of the substrate.

As used herein, "ambient conditions" refers to the conditions of the surrounding environment (e.g., the temperature, humidity, and pressure of the room or outdoor environment in which the substrate is located). The term "actinic radiation" refers to electromagnetic radiation that can initiate chemical reactions. Actinic radiation includes, but is not limited to, visible light, ultraviolet (UV) light, X-ray, and gamma radiation.

The coatings of the present invention can be applied and cured to a dry film thickness of less than 1 micrometer, less than 0.8 micrometer, less than 0.5 micrometer, or less than 0.1 micrometer.

It is appreciated that the coating compositions of the present invention can be applied directly onto the surface of a substrate to form a coating layer directly over the surface of the substrate. Alternatively, the coating compositions of the present invention can be applied over a first coating layer such as a first coating layer formed on the surface of an electronic device comprising a touch screen or display. As such, the coating compositions of the present invention can be applied over a first coating layer and cured to form a second top coating layer.

The first coating layer can be formed from various types of compositions. The first coating layer can be formed from a coating composition comprising any of a variety of thermoplastic and/or thermosetting resins known in the art. The thermoplastic and/or thermosetting resins can include, but are not limited to, any of the additional resins previously described. The coating composition can also include, but is not limited to, any of the previously described crosslinkers. In some examples, the first coating comprises a resin with an active-hydrogen containing group that can react with the alkoxy groups of the alkoxysilane functionalized polysiloxane polymer. As used herein, an "active-hydrogen containing group" refers to a hydroxyl group, a primary amino group, a secondary amino group, a thiol group, and combinations thereof.

The coatings deposited from the coating compositions of the present invention can provide a low coefficient of friction between the coating surface and an individual's fingertips. Thus, coatings deposited from the coating compositions of the present invention can improve the ability of a user to operate a touch screen or display of an electronic device. For example, coatings deposited from the coating compositions of the present invention can provide a coefficient of friction of less than 0.04. The coefficient of friction of the coatings described herein are measured by a Dynisco 1055 Coefficient of Friction Tester, a Chatillion DGGS Force Gauge and a standard steel plate. During testing of the coefficient of friction, the stainless steel plate is placed on the coating surface and dragged across the surface at a constant speed of 6 inches/minute. The ratio of the force that maintains movement of the steel plate on the coating surface and the weight of the steel plate is then determined. Thus, as used herein, "coefficient of friction" refers to the ratio of the force that maintains movement of the steel plate on the coating surface and the weight of the steel plate.

The coatings deposited from the coating compositions of the present invention can also provide good light transmittance, which prevents the coating from adversely affecting the functionality and use of a touch screen or display. For instance, the coatings can be prepared as transparent coatings that allow at least 80% light transmittance, at least 85% light transmittance, or at least 90% light transmittance. Transmittance measurements are determined by a Perkin Elmer Lambda 950 UV/Vis/NIR Spectrophotometer with a wavelength range of 400-800 nm. As used herein, the term "transparent" refers to a coating, wherein a surface beyond the coating is visible to the naked eye when viewed through the coating. Further, the term "transmittance" refers to the amount of light that passes through a coating or film divided by the total amount of light incident upon the sample.

The following examples are presented to demonstrate the general principles of the invention. The invention should not be considered as limited to the specific examples presented. All parts and percentages in the examples are by weight unless otherwise indicated.

EXAMPLE 1

Preparation of an Alkoxysilane Functionalized Polysiloxane Polymer

An alkoxysilane functionalized polysiloxane polymer according to the present invention was prepared by adding 200 grams of KF-868 (a polysiloxane polymer with pendant amino groups having a functional group equivalent weight of 8,800, commercially available from ShinEtsu) and 9.3 grams of SILQUEST® A-174 (gamma-methacryloxypropyltrimethoxy silane, commercially available from Momentive) to a four necked round bottom flask fitted with a thermocouple, mechanical stirrer, and condenser, and then heated up to 80° C. under a $N_2$ blanket. Once the temperature reached 80° C., the mixture was held at 80° C. for five hours and then cooled to room temperature.

The resulting alkoxysilane functionalized polysiloxane polymer had an amine value of 0.126 milliequivalence/g (meq/g). As used herein, the "milliequivalence (meq)" refers to the number of amine groups in solution as determined by their concentration in a given volume. The amine content was determined by dissolving the alkoxysilane functionalized polysiloxane polymer in acetic acid and titrating potentiometrically with acetous perchloric acid. The amine content of the polymer is equal to the number of milliequivalents of perchloric acid required to neutralize the amine content in one gram of the test material as measured by potentiometric titration.

The alkoxysilane functionalized polysiloxane polymer also had a Gardner-Holdt Viscosity at 25±1° C. of A (corresponding to 0.50 stokes). The tube viscosity was determined by pouring the polymer into a tube having an inside diameter of 10.65±0.025 mm and an outside length of 114±1 mm. The polymer was added until the 100 mm line of the tube was reached. After inserting a cork, the tube was placed into an inversion rack and immersed in a water bath having a temperature of 25±1° C. The polymer filled tube was allowed to stand in the water bath for a minimum of 20 minutes. The inversion rack was then removed from the water bath and quickly rotated at 180°. The rate of travel of an air bubble through the polymer between the 27 and 100 mm lines of the tube is recorded and associated with a corresponding Gardner-Holdt Viscosity.

EXAMPLE 2

Preparation of an Alkoxysilane Functionalized Polysiloxane Polymer

An alkoxysilane functionalized polysiloxane polymer according to the present invention was prepared by adding 250 grams of KF-865 (a polysiloxane polymer with pendant amino groups having a functional group equivalent weight of 5,000, commercially available from ShinEtsu) and 13.0 grams of SILQUEST® A-174 (gamma-methacryloxypropyltrimethoxy silane, commercially available from Momentive) to a four necked round bottom flask fitted with a thermocouple, mechanical stirrer, and condenser, and then heated up to 80° C. under a N2 blanket. Once the temperature reached 80° C., the mixture was held at 80° C. for five hours and then cooled to room temperature. The resulting alkoxysilane functionalized polysiloxane polymer had an amine milliequivalence (meq) of 0.175, and a Gardner-Holdt Viscosity at 25±1° C. of A (corresponding to 0.50 stokes) using the testing methods previously described.

COMPARATIVE EXAMPLE 3

Preparation of a Polyacrylic Polymer with Alkoxysilane and Polysiloxane Side Chains A polyacrylic polymer with alkoxysilane and polysiloxane side chains was prepared by adding 150 grams of DOWANOL™ PM acetate (propylene glycol methyl ether acetate, commercially available from Dow) to a four necked round bottom flask fitted with a thermocouple, mechanical stirrer, and condenser, and then heated up to 120° C. under a N2 blanket. Next, 90 grams of X-22-2426 (a polysiloxane polymer with a terminal methacrylate group having a functional group equivalent weight of 12,000, commercially available from ShinEtsu) and 10.0 grams of SILQUEST® A-174 (gamma-methacryloxypropyltrimethoxy silane, commercially available from Momentive) were charged into the flask over 3 hours. Simultaneously, a mixture of 40 grams of DOWANOL™ PM acetate and 8 grams of LUPEROX® 26 (polymer initiator, commercially available from Arkema) were charged to the flask. After 30 minutes of holding, a mixture of 20 grams of DOWANOL™ PM acetate and 2 grams of LUPEROX® 26 were charged over 30 minutes. The reaction was held for an additional hour before cooling and discharge. The resulting polymer solution had a solid content of 37.4%.

EXAMPLE 4

Preparation of Coating Compositions

Three (3) coating compositions, coating compositions A, B, and C, were prepared from the polymers of Examples 1-3, respectively. Each coating composition was independently prepared by mixing the polymer of either Example 1 (coating composition A), Example 2 (coating composition B), or Comparative Example 3 (coating composition C) with n-butyl acetate (obtained commercially from Univar, technical grade). The polymer was added to the coating composition such that the composition contained 1.0 percent (%) by weight of the polymer, based on the total weight of the composition including solvent.

Next, a 5% (v/v) aqueous solution of nitric acid was reduced to 0.5% (v/v) with deionized water. About 0.4 grams of the 0.5% (v/v) nitric acid solution was then mixed with 100 grams of the coating composition comprising the polymer and n-butyl acetate.

EXAMPLE 5

Application and Evaluation of Cured Coatings

The coatings compositions prepared in Example 4 (coating composition A, coating composition B, and coating composition C) were each independently applied to uncoated GORILLA® glass substrates. Each coated substrate was then subjected to a single bake at 200° C. for 10 minutes. The coefficient of friction of each coating was tested with a Dynisco 1055 Coefficient of Friction Tester, a Chatillion DGGS Force Gauge, and a 199.2 gram standard steel plate. During testing of the coefficient of friction, the stainless steel plate was placed on the coatings surface and dragged across the surface at a constant speed of 6 inches/minute and at a temperature of 72° F. (22° C.) and 33% relative humidity. Three tests were run on each coating and the average coefficient of friction for each coating was obtained. The results are shown in Table 1.

TABLE 1

| Coating | Average Coefficient of Friction |
|---|---|
| Coating prepared from composition A [1] | 0.024 |
| Coating prepared from composition B [2] | 0.016 |
| Coating prepared from composition C [3] | 0.077 |

[1] Composition A was prepared with the polymer of Example 1.
[2] Composition B was prepared with the polymer of Example 2.
[3] Composition C was prepared with the polymer of comparative Example 3.

As shown in Table 1, the coatings prepared from coating compositions A and B according to the present invention provided a lower coefficient of friction on a glass substrate as compared to composition C of Comparative Example 3.

The present invention is also directed to the following clauses.

Clause 1: An alkoxysilane functionalized polysiloxane polymer prepared from a mixture of reactants comprising: (a) a polysiloxane polymer represented by Chemical Structure (I): wherein

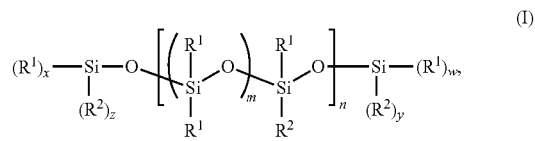

m is a value of 10 or greater,
n is a value of 2 or greater,
w, x, y, and z are each independently selected from a value of 0 to 3 provided that x+z=3 and w+y=3,
each $R^1$ is independently hydrogen or a $C_1$-$C_6$ alkyl,
each $R^2$ is independently hydrogen, a $C_1$-$C_6$ alkyl, -A-$NH_2$, -A-OH, -A-N=C=O, -A-COOH, or

A is a $C_1$-$C_6$ alkylene or $R^3$—NH—$R^3$, and
each $R^3$ is independently a $C_1$-$C_6$ alkylene,
wherein each $R^2$, z, and y are chosen to provide two or more reactive functional groups on the polysiloxane polymer that are selected from -A-$NH_2$, -A-OH, -A-N=C=O, -A-COOH,

or combinations thereof; and
(b) at least one alkoxysilane comprising a functional group B that is reactive with the reactive functional groups of $R^2$ on the polysiloxane polymer of (a).

Clause 2: The alkoxysilane functionalized polysiloxane polymer of clause 1, wherein the molar ratio of the total amount of the reactive functional groups of the polysiloxane polymer to the total amount of the functional group B of all alkoxysilanes is from 1:1 to 1:0.01 such as from 1:1 to 1:0.05, or from 1:1 to 1:0.1, or from 1:1 to 1:0.5.

Clause 3: The alkoxysilane functionalized polysiloxane polymer of clauses 1 or 2, wherein the alkoxysilane functionalized polysiloxane polymer has a weight average molecular weight of greater than 2,500 g/mol such as greater than 5,000 g/mol, or greater than 10,000 g/mol, or greater than 15,000 g/mol.

Clause 4: The alkoxysilane functionalized polysiloxane polymer of any of clauses 1 to 3, wherein the functional group B of the alkoxysilane is an ethylenically unsaturated group such as a (meth)acrylate group; an epoxy group; an amino group; a hydroxyl group; or an isocyanate group.

Clause 5: The alkoxysilane functionalized polysiloxane polymer of any of clauses 1 to 4, wherein the alkoxysilane of (b) is represented by Chemical Structure (II):

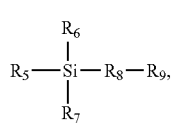

wherein
$R_5$, $R_6$, and $R_7$ are each an alkoxy group such as a $C_1$-$C_6$ alkoxy group,
$R_8$ is a $C_1$-$C_{20}$ alkylene, and
$R_9$ is an ethylenically unsaturated group such as a (meth) acrylate group; an epoxy group; an amino group; a hydroxyl group; or an isocyanate group that is reactive with the two or more reactive functional groups on the polysiloxane polymer.

Clause 6: The alkoxysilane functionalized polysiloxane polymer of clause 5, wherein $R^2$ of the polysiloxane polymer is -A-NH2 and $R^9$ of the alkoxysilane is an ethylenically unsaturated group.

Clause 7: The alkoxysilane functionalized polysiloxane polymer of clause 6, wherein z and y of the polysiloxane polymer are both 0.

Clause 8: A coating composition comprising the alkoxysilane functionalized polysiloxane polymer of any of clauses 1 to 7.

Clause 9: The coating composition of clause 7, wherein the alkoxysilane functionalized polysiloxane polymer comprises 0.01 to 10 weight % such as 0.05 to 10 weight %, 1 to 10 weight %, or 1 to 8 weight % of the coating composition, based on the total weight of the coating composition.

Clause 10: The coating composition of clauses 8 or 9, further comprising a protonic acid.

Clause 11: The coating composition of clause 10, wherein the protonic acid comprises a carboxylic acid, a hydrogen halide, sulfuric acid, nitric acid, or combinations thereof.

Clause 12: The coating composition of clauses 10 or 11, wherein the protonic acid is present in the coating composition in an amount of from 0.01 to 5 parts by weight per 100 parts by weight of the alkoxysilane functionalized polysiloxane polymer.

Clause 13: The coating composition of any of clauses 8 to 12, further comprising a non-aqueous solvent.

Clause 14: A substrate at least partially coated with the coating composition of any of clauses 8 to 13 or with a coating resulting from drying or curing the coating composition of any of clauses 8 to 13.

Clause 15: The substrate of clause 14, wherein the substrate comprises glass.

Clause 16: The substrate of clauses 14 or 15, wherein the substrate forms at least a portion of an electronic device.

Clause 17: The substrate of any of clauses 14 to 16, wherein the coating composition is heated for a temperature selected with in a range of 150° C. to 250° C. for a time period selected with in a range of 5 minutes to 80 minutes to form a cured coating.

Clause 18: The substrate of any of clauses 14 to 17, wherein the cured coating has a dry film thickness of less than 1 micrometer, less than 0.8 micrometer, less than 0.5 micrometer, or less than 0.1 micrometer.

Clause 19: A method of applying a coating to a substrate comprising:
a) mixing the alkoxysilane functionalized polysiloxane polymer of any of clauses 1 to 7 in a non-aqueous medium with a protonic acid; and
b) applying the mixture of (a) at least partially over a substrate under conditions to form a coating over the substrate.

Clause 20: The method of clause 19, wherein the coating is formed by heating the applied mixture for a temperature selected within a range of 150° C. to 250° C. for a time period selected within a range of 5 minutes to 80 minutes.

Clause 21: The method of clause 20, wherein the coating has a dry film thickness of less than 1 micrometer, less than 0.8 micrometer, less than 0.5 micrometer, or less than 0.1 micrometer.

Clause 22: The method of any of clauses 19 to 21, wherein the substrate is an electronic device.

Clause 23: A coated substrate obtained by the method of any of clauses 19 to 22.

Clause 24: A method of preparing an alkoxysilane functionalized polysiloxane polymer comprising reacting a mixture of reactants comprising:
a) a polysiloxane polymer represented by Chemical Structure (I):
wherein

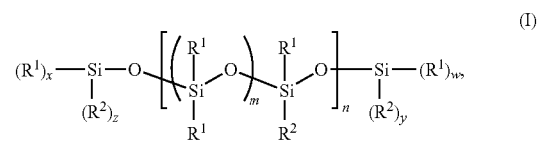

m is a value of 10 or greater,
n is a value of 2 or greater,
w, x, y, and z are each independently selected from a value of 0 to 3 provided that x+z=3 and w+y=3,
each $R^1$ is independently hydrogen or a $C_1$-$C_6$ alkyl,
each $R^2$ is independently hydrogen, a $C_1$-$C_6$ alkyl, -A-NH$_2$, -A-OH, -A-N=C=O, -A-COOH, or

A is a $C_1$-$C_6$ alkylene or $R^3$—NH—$R^3$, and
each $R^3$ is independently a $C_1$-$C_6$ alkylene,
wherein each $R^2$, z, and y are chosen to provide two or more reactive functional groups on the polysiloxane polymer that are selected from -A-NH$_2$, -A-OH, -A-N=C=O, -A-COOH,

or combinations thereof; and
b) at least one alkoxysilane comprising a functional group B that is reactive with the reactive functional groups of R² on the polysiloxane polymer of (a).

Clause 25: The method of clause 24, wherein (a) the polysiloxane polymer and (b) the alkoxysilane are reacted together at a temperature selected within a range of 40° C. to 100° C.

Clause 26: The method of clauses 24 or 25, wherein (a) the polysiloxane polymer and (b) the alkoxysilane are reacted together in a non-aqueous medium.

Clause 27: The method of any of clauses 19 to 22 or 26 or the coating composition of clause 13 wherein the non-aqueous solvent is an organic solvent or a mixture of an organic solvent with less than 50 weight % of water such as less than 40 weight % of water, or less than 30 weight % of water, or less than 20 weight % of water, or less than 10 weight % of water, or less than 5% of water, based on the total weight of the solvent mixture.

Whereas particular embodiments of this invention have been described above for purposes of illustration, it will be evident to those skilled in the art that numerous variations of the details of the present invention may be made without departing from the invention as defined in the appended claims.

The invention claimed is:

1. An alkoxysilane functionalized polysiloxane polymer prepared from a mixture of reactants comprising:
   a) a polysiloxane polymer represented by Chemical Structure (I):

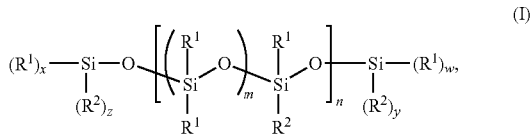

wherein
m is a value of 10 or greater,
n is a value of 2 or greater,
w and x are each independently a value of 3 and z and y are both 0,
each R¹ is independently hydrogen or a $C_1$-$C_6$ alkyl,
each R² is -A-$NH_2$
A is a $C_1$-$C_6$ alkylene or R³—NH—R³, and
each R³ is independently a $C_1$-$C_6$ alkylene;
and
   b) at least one alkoxysilane comprising a functional group B that is reactive with the reactive functional groups of R² on the polysiloxane polymer of (a), wherein the at least one alkoxysilane is represented by Chemical Structure (II):

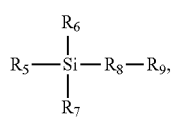

wherein
$R_5$, $R_6$, and $R_7$ are each an alkoxy group,
$R_8$ is a $C_1$-$C_{20}$ alkylene, and
$R_9$ is an ethylenically unsaturated group.

2. The alkoxysilane functionalized polysiloxane polymer of claim 1, wherein a molar ratio of a total amount of the reactive functional groups of the polysiloxane polymer to a total amount of the functional group B of all alkoxysilanes is from 1:1 to 1:0.01.

3. The alkoxysilane functionalized polysiloxane polymer of claim 1, wherein the alkoxysilane functionalized polysiloxane polymer has a weight average molecular weight of greater than 2,500 g/mol.

4. A coating composition comprising an alkoxysilane functionalized polysiloxane polymer according to claim 1.

5. The coating composition of claim 4, wherein the alkoxysilane functionalized polysiloxane polymer comprises from 0.01 to 10 weight % of the coating composition, based on the total weight of the coating composition.

6. The coating composition of claim 4, further comprising a protonic acid.

7. The coating composition of claim 6, wherein the protonic acid comprises a carboxylic acid, a hydrogen halide, sulfuric acid, nitric acid, or combinations thereof.

8. The coating composition of claim 6, wherein the protonic acid is present in the coating composition in an amount of from 0.01 to 5 parts by weight per 100 parts by weight of the alkoxysilane functionalized polysiloxane polymer.

9. The coating composition of claim 4, further comprising a non-aqueous solvent.

10. A substrate at least partially coated with the coating composition of claim 4.

11. The substrate of claim 10, wherein the substrate comprises glass.

12. The substrate of claim 11, wherein the substrate forms at least a portion of an electronic device.

13. The substrate of claim 10, wherein the coating composition is heated for a temperature selected within a range of 150° C. to 250° C. to form a cured coating with a dry film thickness of less than 1 micrometer.

14. A method of applying a coating to a substrate comprising:
   a) mixing the alkoxysilane functionalized polysiloxane polymer according to claim 1 in a non-aqueous medium with a protonic acid; and
   b) applying the mixture of (a) at least partially over a substrate under conditions to form a coating over the substrate.

15. The method of claim 14, wherein a molar ratio of a total amount of the reactive functional groups of the polysiloxane polymer to a total amount of the functional group B of all alkoxysilanes is from 1:1 to 1:0.01.

16. The method of claim 14, wherein the coating is formed by heating the applied mixture at a temperature selected within a range of 150° C. to 250° C.

17. The method of claim 14, wherein the substrate forms at least a portion of an electronic device.

18. A method of preparing an alkoxysilane functionalized polysiloxane polymer comprising reacting a mixture of reactants comprising:
   a) a polysiloxane polymer represented by Chemical Structure (I):

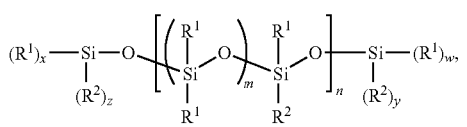 (I)

wherein
m is a value of 10 or greater,
n is a value of 2 or greater,
w and x are each independently a value of 3 and z and y are both 0,
each $R^1$ is independently hydrogen or a $C_1$-$C_6$ alkyl,
each $R^2$ is -A-$NH_2$
A is a $C_1$-$C_6$ alkylene or $R^3$—NH—$R^3$, and
each $R^3$ is independently a $C_1$-$C_6$ alkylene;
and
   b) at least one alkoxysilane comprising a functional group B that is reactive with the reactive functional groups of $R^2$ on the polysiloxane polymer of (a), wherein the at least one alkoxysilane is represented by Chemical Structure (II):

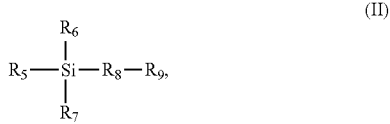 (II)

wherein
$R_5$, $R_6$, and $R_7$ are each an alkoxy group,
$R_8$ is a $C_1$-$C_{20}$ alkylene, and
$R_9$ is an ethylenically unsaturated group.

19. The method of claim 18, wherein (i) the polysiloxane polymer and (ii) the alkoxysilane are reacted together at a temperature selected within a range of 40° C. to 100° C.

* * * * *